United States Patent [19]
Caffin

[11] Patent Number: 5,143,651
[45] Date of Patent: Sep. 1, 1992

[54] ZINC OXIDE-BASED COMPOSITION FOR LOW AND MEDIUM VOLTAGE VARISTORS

[75] Inventor: Jean-Pierre Caffin, Dijon, France

[73] Assignee: Compagnie Europeenne De Composants Electroniques LCC, Courbevoie, France

[21] Appl. No.: 578,683

[22] Filed: Sep. 7, 1990

[30] Foreign Application Priority Data

Sep. 8, 1989 [FR] France .............................. 89 11751

[51] Int. Cl.$^5$ .......................... H01B 1/00; H01C 7/10
[52] U.S. Cl. .................................. 252/518; 252/519; 338/21
[58] Field of Search .................. 252/518, 519; 338/20, 338/21

[56] References Cited

U.S. PATENT DOCUMENTS 4,719,064  1/1988  Nakata et al. .......................... 264/61
4,996,510  2/1991  Becker et al. .......................... 338/21

FOREIGN PATENT DOCUMENTS 0154184  9/1985  European Pat. Off.

OTHER PUBLICATIONS

*Revue Generale De L'Electricite*, (1986), 9, pp. 9–18, "Les Varistances A Base D'Oxyde De Zinc: Des Elements De Protection A L'Etat Solide . . ." Lagrange.
*Journal of Materials Science Letters*, (1985), vol. 4, pp. 1305–1307, "Improvement of Nonlinearity in a ZnO Varistor by $Al_2O_3$ Doping", Tsai et al.

*Primary Examiner*—Josephine Barr
*Attorney, Agent, or Firm*—Oblon, Spivak, McClelland, Maier & Neustadt

[57] ABSTRACT

A composition based on zinc oxide for low and medium voltage varistors which contains additional elements in the form of oxides, where the oxides are contained in the composition in accordance with the following percentages by weight:

| | | |
|---|---|---|
| 2.5 | $\leq Sb_2O_3$ | $\leq 4.5$ |
| 0.8 | $\leq Co_3O_4$ | $\leq 1$ |
| 0.4 | $\leq NiO$ | $\leq 1$ |
| 0 | $< Cr_2O_3$ | $\leq 0.8$ |
| 0.6 | $\leq Mn_3O_4$ | $\leq 0.8$ |
| 4.2 | $\leq Bi_2O_3$ | $\leq 4.6$ |
| 0.05 | $\leq PbO$ | $\leq 0.15$ |
| 0.001 | $\leq SiO_2$ | $\leq 0.005$ |
| 0.001 | $\leq Al_2O_3$ | $\leq 0.002$ |
| 0.04 | $\leq B_2O_3$ | $\leq 0.07$ |

3 Claims, No Drawings

ZINC OXIDE-BASED COMPOSITION FOR LOW AND MEDIUM VOLTAGE VARISTORS

BACKGROUND OF THE INVENTION

1. Field of the Invention

The present invention relates to zinc oxide-based ceramic compositions intended particularly for low and medium voltage varistors.

2. Discussion of the Background

A varistor is an electric component in which the resistance decreases strongly when the voltage, applied to its terminals increases. This remarkable characteristic allows this component to be used in applications for protection against overvoltages in electric circuits.

Several types of resistors are known which vary in a non-linear manner as a function of the voltage applied to their terminals, including Zener diodes which are used in the lowering of low voltages, and varistors based on zinc oxide or other metallic oxides manufactured by ceramic techniques. These components are low in cost and can be used over a large voltage range (practically from 3 volts to a few kilovolts).

Varistors have been widely used to stabilize the voltage of electric circuits or to remove the overvoltages induced in a circuit.

The electrical characteristics of such varistors is expressed by the ratio:

$$I = K \times V^{\alpha}$$

where V is the voltage at the terminals of the varistor, I the current which passes through it, K a constant depending on the geometry of the varistor element and on the technology used to make it and $\alpha$ the coefficient of non-linearity. The varistor effect is more pronounced when the value of the coefficient is high.

To characterize the non-linearity of the varistor, the ratios $V_{1mA}/V_{10\mu A}$ and $V_{10A}/V_{1mA}$ are frequently used, that is, the ratios of the voltages corresponding to 1mA, 10μA and 10A, 1mA respectively. $V_{1mA}/V_{10\mu A}$ characterizes the escape current of the varistor and $V_{10A}/V_{1mA}$ the lowering. The ideal and theoretical case is where these values are equal to 1. In practice, these ratios are greater than 1.

Varistors based on zinc oxide and containing additives have already been described, for example in EP 29 749. The compositions cited in EP 29 749 contain as additives one or several combinations of bismuth, cobalt, manganese, boron, aluminum, silver, gallium, antimony, chromium, nickel and silicon oxides. These compositions generally have a good coefficient of non-linearity but do not simultaneously provide:

a good current-voltage characteristics,
good resistance to current shocks, and
high stability of the electrical properties in moist heat, even in the presence of a coating.

SUMMARY OF THE INVENTION

Accordingly, one object of the present invention is to overcome these disadvantages, by means of varistor compositions simultaneously having good non-linearity ($V_{1mA}/V_{10\mu A} \leq 1.20$ and $V_{10A}/V_{1mA} \leq 1.40$), good resistance to current shocks ($\geq 5000$ A/cm$^2$), as well as high stability of the electrical properties during tests in moist heat (elements subjected to a temperature of 40° C. and at 90% relative humidity, for 56 days).

This and other objects of the invention have been achieved by a composition based on zinc oxide for low and medium voltage varistors which contains the addition of elements in the form of oxides, wherein the oxides are contained in the composition in accordance with the following percentages by weight:

| | | |
|---|---|---|
| 2.5 | $\leq$ Sb$_2$O$_3$ | $\leq$ 4.5 |
| 0.8 | $\leq$ Co$_3$O$_4$ | $\leq$ 1 |
| 0.4 | $\leq$ NiO | $\leq$ 1 |
| 0 | $<$ Cr$_2$O$_3$ | $\leq$ 0.8 |
| 0.6 | $\leq$ Mn$_3$O$_4$ | $\leq$ 0.8 |
| 4.2 | $\leq$ Bi$_2$O$_3$ | $\leq$ 4.6 |
| 0.05 | $\leq$ PbO | $\leq$ 0.15 |
| 0.001 | $\leq$ SiO$_2$ | $\leq$ 0.005 |
| 0.001 | $\leq$ Al$_2$O$_3$ | $\leq$ 0.002 |
| 0.04 | $\leq$ B$_2$O$_3$ | $\leq$ 0.07 |

A further object of the invention is a varistor for low and medium voltage, characterized in that it is composed from the above-described composition.

DETAILED DESCRIPTION OF THE PREFERRED EMBODIMENTS

In accordance with the present invention, compositions based on zinc oxide having low and medium voltage varistance properties have been prepared from the following oxides: ZnO, Sb$_2$O$_3$, Co$_3$O$_4$, NiO, Cr$_2$O$_3$, Mn$_3$O$_4$, Bi$_2$O$_3$, PbO, SiO$_2$, Al$_2$O$_3$ and B$_2$O$_3$.

It has been discovered that those compositions provide varistors simultaneously having:

good non-linearity ($V_{1mA}/V_{10\mu A} \leq 1.20$ and $V_{10A}/V_{1mA} \leq 1.40$),
good resistance to current shocks, and
high stability of the electrical properties during tests in moist heat.

It is considered that the varistors have sufficient stability of their electrical properties if the relative variation in voltage for a current of 1mA traversing the varistor does not exceed 5% after having undergone the moist heat test.

It has been discovered that the compositions having these properties satisfaction are those having, in addition to zinc oxide (ZnO), the following oxides in the amounts indicated in percentages by weight:

| | | |
|---|---|---|
| 2.5 | $\leq$ Sb$_2$O$_3$ | $\leq$ 4.5 |
| 0.8 | $\leq$ Co$_3$O$_4$ | $\leq$ 1 |
| 0.4 | $\leq$ NiO | $\leq$ 1 |
| 0 | $<$ Cr$_2$O$_3$ | $\leq$ 0.8 |
| 0.6 | $\leq$ Mn$_3$O$_4$ | $\leq$ 0.8 |
| 4.2 | $\leq$ Bi$_2$O$_3$ | $\leq$ 4.6 |
| 0.05 | $\leq$ PbO | $\leq$ 0.15 |
| 0.001 | $\leq$ SiO$_2$ | $\leq$ 0.005 |
| 0.001 | $\leq$ Al$_2$O$_3$ | $\leq$ 0.002 |
| 0.04 | $\leq$ B$_2$O$_3$ | $\leq$ 0.07 |

It has further been noted that it is especially due to the precise adjustment of the content of Al$_2$O$_3$ (between 10 and 20 ppm) and B$_2$O$_3$ (between 400 and 700 ppm) that satisfactory compositions have been obtained.

It was known that the presence of aluminum in a composition based on zinc oxide improves the electrical conductivity of the composition. However, it has now been discovered that the amount of aluminum in these compositions must be as low as possible so as to have a very low escape current, good resistance to current shocks and a very low coefficient of voltage temperature.

The voltage temperature coefficient k is generally defined for a voltage corresponding to a current of 1mA in accordance with the ratio:

$$k = \frac{V_1 - V_2}{V_2} \times \frac{1}{\Delta T}.$$

In this ratio, $V_1$ is the voltage measured at the terminals of the varistor, for a current of 1mA at 85° C.; $V_2$ the voltage measured at the terminals of the varistor, for a current of 1mA at 25° C.; and $\Delta T$ is the difference between the temperatures, which is 60° C. The temperature coefficient is a negative value given in per °C. The temperature coefficient of the voltage will be satisfactory if its absolute value is less than 0.05%/°C.

It has also been discovered that the presence of boron enables one to, simultaneously, decrease the escape current of a varistor and improve the stability of the electrical properties in moist heat. However, the amount of $B_2O_3$ must not be too high in order not to deteriorate the resistance to current shocks.

Non-limiting examples of the compositions of the invention are given below. The measurements of the electrical characteristics are carried out on varistors obtained from sintered masses in the form of rectangular, square or circular plates, with each plate having electrodes on its principal surfaces, with conductive wires contacting said electrodes, for example through soldering.

EXAMPLES

Example I

Zinc oxide, antimony oxide, cobalt oxide nickel oxide, chromium oxide, manganese oxide, aluminum oxide, and lead and bismuth borosilicate were mixed in deionized water in the amounts indicated in Table I. Each composition was dried and then pressed into the shape of discs with a diameter of 9 mm and a thickness of 1.5 mm. The pieces were warmed at 700° C. and then sintered at 1200° C. Each ceramic piece was then metallized on its two principal surfaces with a layer of silver deposited by serigraphy and heated to 600° C. A layer of metallization of 1 mm was left on the periphery of each piece. Connections were soldered on the metallized surfaces. After cleaning, the pieces were coated with a resin or an epoxy varnish.

Table I lists compositions referenced C1 to C6 and comprising in percentages by weight:

2.71% of $Sb_2O_3$
0.932% of $Co_3O_4$
0.869% of NiO
0.0885% of $Cr_2O_3$
0.708% of $Mn_3O_4$
4.5% of $Bi_2O_3$
0.138% of PbO
0.003% of $SiO_2$
0.04% of $B_2O_3$ and an amount of $Al_2O_3$ varying within the indicated limits. The electrical characteristics given in this Table clearly show the important role played by the aluminum, even in a very small quantity on the electrical properties of the varistors.

In Table I, $V_o$ represents the threshold voltage in V/mm, J the density of current in A/cm² and k the temperature coefficient of the voltage in %/°C.

From Table I, it can be seen that in order to simultaneously satisfy the previously mentioned requirements, the amount of $Al_2O_3$ must be between 0.001 and 0.002 (that is, between 10 and 20 ppm). If the amount of $Al_2O_3$ is less than 0.001%, the voltage lowering is poor: $V_{10A}/V_{1mA} > 1.40$. If the amount of $Al_2O_3$ is greater than 0.002%, the escape current is greater than 1.20 and the resistance to current shocks of 5000 A/cm² is poor.

It is also noted that for the preferred compositions (for example C2 and C3), the temperature coefficient k is also satisfactory (absolute value less than 0.05%/°C.).

EXAMPLE II

The pieces whose compositions (C7 to C12) are given in Table II were prepared in the same manner as in Example I.

Table II lists compositions referenced C7 to C12 and comprising in percentages by weight:

2.71% of $Sb_2O_3$
0.9% of $Co_3O_4$
0.87% of NiO
0.09% of $Cr_2O_3$
0.7% of $Mn_3O_4$
4.6% of $Bi_2O_3$
0.13% of PbO
0.003% of $SiO_2$
0.001% of $Al_2O_3$ and an amount of $B_2O_3$ varying within the indicated limits. The electrical characteristics given in this table show that the amount of $B_2O_3$ must be between 0.04 and 0.07% to simultaneously satisfy the previously indicated requirements. If the amount of $B_2O_3$ is less than 0.04%, the deviation in voltage at 1mA ($\Delta V/V$) is greater than 5%. If the amount of $B_2O_3$ is greater than 0.07%, the deviation in voltage in the resistance to current shocks of 5000 A/cm² is poor.

TABLE I

| No. | $Al_2O_3$ | $V_0$ | $\frac{V_{1mA}}{V_{10\mu A}}$ | $\frac{V_{10A}}{V_{1mA}}$ | J | k |
| --- | --- | --- | --- | --- | --- | --- |
| C1 | 0.0004 | 160 | 1.12 | 1.42 | 6000 | −0.02 |
| C2 | 0.001 | 170 | 1.13 | 1.40 | 5500 | −0.025 |
| C3 | 0.002 | 190 | 1.17 | 1.37 | 5000 | −0.03 |
| C4 | 0.003 | 215 | 1.20 | 1.36 | 4500 | −0.04 |
| C5 | 0.004 | 250 | 1.22 | 1.36 | 4700 | −0.046 |
| C6 | 0.005 | 265 | 1.28 | 1.35 | 4500 | −0.052 |

TABLE II

| No. | $B_2O_3$ | $V_0$ | $\frac{V_{1mA}}{V_{10\mu A}}$ | $\frac{V_{10A}}{V_{1mA}}$ | J | $\left(\frac{\Delta V}{V}\right)$ |
| --- | --- | --- | --- | --- | --- | --- |
| C7 | 0.02 | 170 | 1.26 | 1.39 | 6000 | −8% |
| C8 | 0.04 | 175 | 1.20 | 1.39 | 5300 | −2% |
| C9 | 0.06 | 165 | 1.15 | 1.40 | 5100 | −1% |
| C10 | 0.08 | 170 | 1.13 | 1.40 | 4900 | −2% |
| C11 | 0.12 | 180 | 1.11 | 1.40 | 3800 | −1% |
| C12 | 0.2 | 195 | 1.09 | 1.42 | 1900 | −1% |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A low medium voltage varistor composition, consisting essentially of zinc oxide and the following oxides in the weight percentages shown below:

| | | |
|---|---|---|
| 2.5 | ≦ Sb$_2$O$_3$ | ≦ 4.5 |
| 0.8 | ≦ Co$_3$O$_4$ | ≦ 1 |
| 0.4 | ≦ NiO | ≦ 1 |
| 0 | < Cr$_2$O$_3$ | ≦ 0.8 |
| 0.6 | ≦ Mn$_3$O$_4$ | ≦ 0.8 |
| 4.2 | ≦ Bi$_2$O$_3$ | ≦ 4.6 |
| 0.05 | ≦ PbO | ≦ 0.15 |

-continued

| | | |
|---|---|---|
| 0.001 | ≦ SiO$_2$ | ≦ 0.005 |
| 0.001 | ≦ Al$_2$O$_3$ | ≦ 0.002 |
| 0.04 | ≦ B$_2$O$_3$ | ≦ 0.07. |

2. A varistor comprising the composition of claim 1.

3. The varistor of claim 2, having a non-linearity $V_{1mA}/V_{10\mu A} \leq 1.2$ and $V_{10A}/V_{1mA} \leq 1.40$.

* * * * *